United States Patent [19]

Theobald et al.

[11] 4,015,325
[45] Apr. 5, 1977

[54] METHOD AND APPARATUS FOR SECURING INSERTS TO CONTAINERS

[75] Inventors: Marvin G. Theobald, La Grange; Richard G. Olson, Chicago, both of Ill.

[73] Assignee: National Can Corporation, Chicago, Ill.

[22] Filed: Mar. 29, 1976

[21] Appl. No.: 671,541

[52] U.S. Cl. .................................. 29/451; 29/453; 29/235
[51] Int. Cl.² ........................................ B23P 11/02
[58] Field of Search ............ 29/451, 450, 453, 235, 29/208 B

[56] References Cited

UNITED STATES PATENTS

| | | | |
|---|---|---|---|
| 2,760,691 | 8/1956 | Henchert | 29/450 UX |
| 2,871,553 | 2/1959 | Binder | 29/451 |
| 3,468,013 | 9/1969 | Sciamonte et al. | 29/451 |
| 3,828,418 | 8/1974 | Laurizio | 29/453 X |

*Primary Examiner*—Charlie T. Moon
*Attorney, Agent, or Firm*—James E. Anderson; Ralph R. Rath

[57] ABSTRACT

A method and apparatus for assembling an apertured insert onto a rim extending from the end of a metal container and surrounding an opening therein is disclosed herein. The method contemplates inserting an expandable support member through the aperture in the insert and moving the member into engagement with the inner surface of the end of the container surrounding the opening. The insert is then forced onto the rim of the container while the end panel is supported by the support member. The apparatus consists of a first member for gripping the insert and a second member adapted to pass through the aperture in the insert with expandable means on the second member for extending beyond the periphery of the opening in the container end wall. The apparatus also incorporates drive means for moving the members and the expansible means in synchronized relation to each other.

8 Claims, 6 Drawing Figures

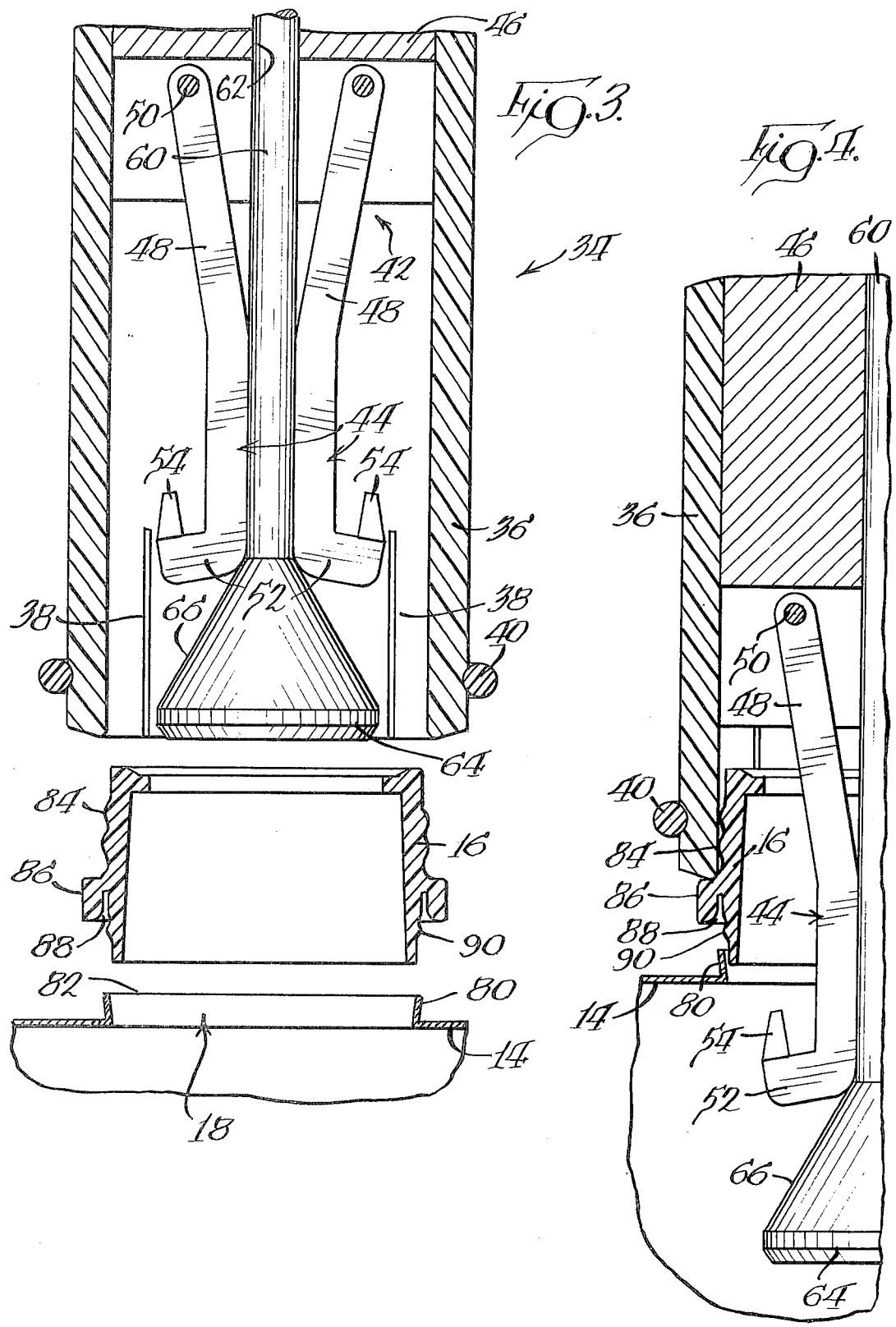

METHOD AND APPARATUS FOR SECURING INSERTS TO CONTAINERS

BACKGROUND OF THE INVENTION

The present invention relates generally to containers and more specifically to metal containers which have nonmetallic inserts for threadedly receiving closure members.

There are many instances in which it is necessary for a container that has a product packaged therein to have a reclosable type closure to reseal the container after it has been initially opened. Samples of products that are packaged in metal containers that require such arrangements are household products, such as detergents, and many other various types of products.

One type of container that has been developed for packaging products of the above type consists of a metal container that has a reduced opening in one end thereof and the opening supports a threaded insert that receives a threaded closure. Thus, the container may be opened and closed as often as is necessary during the use of the product therein.

One type of insert that has been used in containers of this type consists of a nonmetallic member that is secured to an upstanding rim that surrounds the opening in the container end wall. Inherent in the design of existing equipment for seaming ends onto container bodies is the necessity of affixing the insert or nozzle on the container after the end has been seamed to the body. One of the problems encountered with containers of this type is the difficulty in inserting the nonmetallic insert onto the container end and provide an adequate seal between the insert and the remainder of the end to prevent any leakage during shipment and storage and withstand the required torque to remove a cap normally threaded onto the nozzle or insert. It will be appreciated that normally the opening in the end of the container is substantially smaller in diameter than the end and is located centrally thereof so that the container end will tend to flex when the insert is being assembled to the body.

SUMMARY OF THE INVENTION

According to the present invention, there is provided an improved method and apparatus for inserting a plastic insert onto a rim surrounding an opening in a container end wall so that sufficient force can be applied to provide an adequate seal between the insert and the container end, as well as being capable of resisting turning movement when the cap associated therewith is removed.

According to the broadest aspect of the present method, an apertured plastic insert is inserted onto the rim surrounding an opening in an end panel of a container by gripping the insert and passing a support member through the aperture in the insert and the opening in the container and moving the support member into engagement with the end panel adjacent the periphery of the opening so that the end panel is supported internally of the container. The nonmetallic insert is then forced onto the rim of the container while the end panel is supported by the support member.

According to the broadest aspect of the apparatus of the present invention, the apparatus consists of support means for supporting the container in an upright position with a first member for gripping an insert that is to be forced onto a rim surrounding an opening in the end panel of the container. A second member is aligned with the opening in the container and the aperture in the insert and has expansible means for extending beyond the periphery of the opening. The apparatus also incorporates drive means for moving the second member relative to the insert and the container to locate the expansible member inside the container. The expansible member is then expanded and moved into engagement with the inside surface of the end panel and the drive means then forces the insert towards the container and into engagement with the rim to provide the proper seal between the insert and the container.

BRIEF DESCRIPTION OF THE SEVERAL VIEWS OF THE DRAWINGS

FIGS. 3 through 6 show the various stages of inserting a plastic insert onto the end panel of a metal container.

DETAILED DESCRIPTION

Figure 1:
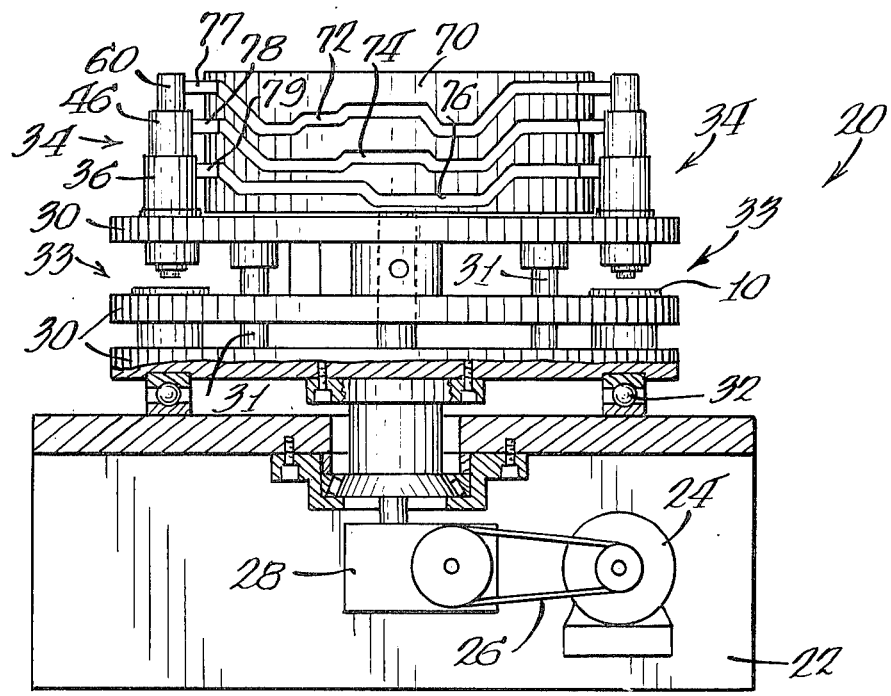
FIG. 1 is a side elevation view, partly in section, of a machine having the present invention incorporated therein.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

Figure 2:
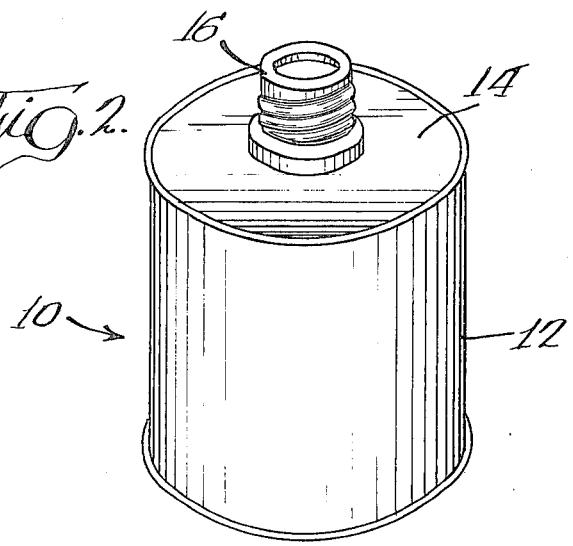
FIG. 2 is a perspective view of a container having a plastic insert secured thereto.

FIG. 2 of the drawings discloses a container 10 having a sidewall 12 and an end panel 14 with a nonmetallic insert 16 inserted into an opening 18 (FIG. 3) in end panel 14.

FIG. 1 of the drawings shows an assembling machine, generally designated by the reference numeral 20 for assembling inserts 16 onto end panels 14 of a container 10. As illustrated in FIG. 1, assembling machine 20 consists of a base 22 that supports a drive motor 24 which is connected by a belt 26 to a reduction right angle gear box 28. The output of gear box 28 is connected to a rotatable turntable consisting of vertically spaced plates 30 that are interconnected by members 31 and are supported on the upper surface of base 22 by suitable bearings 32. The rotatable turntable, consisting of the three vertically spaced plates 30, has a plurality of assembly stations 33 located at circumferentially spaced locations on the periphery thereof. Each of the stations 33 has support means (lower plates 30) for supporting containers 10 in a fixed position with respect to an inserting assembly 34 which is vertically aligned with the support means defined by openings in plates 30. The respective inserting assemblies are identical in construction and are shown in detail in FIG. 3.

Inserting assembly 34 consists of a first or outer member 36 that is adapted to grip an insert 16 around the periphery thereof. For this purpose, outer member 36 is preferably formed of a resilient plastic material and is in the form of a hollow cylinder having a plurality of slots 38 extending from the lower end thereof. The lower end of resilient member 36 is held in a contracted condition by an elastomeric member 40 that surrounds the periphery of member 36.

Insert assembly 34 also includes a second member 42 which has expansible means 44 supported thereon. In the illustrated embodiment, the member 42 consists of a plunger 46 that is reciprocated within cylindrical member 36 and has a plurality of jaws 48 pivotally supported by pivot pins 50 at the upper ends thereof. Jaws 48 each have a lower outwardly directed portion 52 and an upwardly directed portion 54 that is spaced from the main body of the jaw. Preferably, the jaws 48 are biased to the position illustrated in FIG. 3 by suitable biasing springs (not shown) cooperating with pins 50 so that the jaws are normally in the position illustrated in FIG. 3, unless moved therefrom by apparatus to be described later.

A rod 60 extends through an aperture 62 in plunger 46 and has a lower end 64 extending beyond the lower ends of jaws 48 when the elements are in the position illustrated in FIG. 3. The lower end 64 of rod 60 defines a camming member for moving the jaws transversely of the axis of rod 62 and, for this purpose, lower end portion 64 has an enlarging tapered surface 66 in the form of a cone.

The drive means for moving the respective members and rod is illustrated in FIG. 1 and consists of a fixed member 70 that is supported adjacent upper plate 30 and has a plurality of camming surfaces 72, 74, 76 defined therein. Each of the camming surfaces cooperates with a camming member 77, 78, 79 that are respectively secured to hollow cylinder 36, plunger 46, and rod 60. The camming surfaces are configured so as to produce the desired motion while the respective assemblies 34 are being rotated relative to the fixed cam member 70, as will be described later.

Before considering the operation of the present apparatus, a further detailed description of the container and insert is necessary. As illustrated in FIG. 3, end panel 14 of container 10 has an upwardly directed rim 80 that surrounds opening 18 and extends above end panel 14, terminating in a flat upper edge 82. Insert 16 has an upper threaded portion 84 with an outwardly directed flange 86 located adjacent the lower end of threaded portion 84 and intermediate opposite ends of insert 16. Flange 86 has an annular groove or recess 88 that opens towards the bottom and is configured to receive rim 80. Insert 16 also has a lip or bulging portion 90 located directly below flange 86 and groove 88.

The sequence of steps through which the insertion apparatus 34 is moved during assembly of an insert 16 onto container 10 are illustrated in FIGS. 3 through 6. Initially, the container is placed in an opening in plate 30 by suitable means (not shown). An insert 16 is then positioned between insertion apparatus 34 and the upper end panel 14 of the container, as illustrated in FIG. 3. This may be accomplished by suitable feeding mechanism such as a vibratory feeder which feeds the inserts in properly oriented fashion to a station located between the path of movement of containers 10 and assemblies 34. For example, a suitable vibrating mechanism could be utilized for feeding inserts in properly oriented fashion to a position illustrated in FIG. 3 and these inserts could then be moved with each station by a suitable retractable collar or other unit (not shown) that engages the lower edge of flange 86.

The first step in assembling insert 16 onto container 10 is to grip insert 16 with a first or gripping member 36. This may be accomplished by configuring the camming surface 76 associated with member 36 such that the member is moved from the position illustrated in FIG. 3 to that illustrated in FIG. 4 where the lower edge of hollow cylindrical member 36 engages the upper surface of flange 86, while insert 16 is supported on a movable collar (not shown). Simultaneous with, subsequent to or prior to the movement of outer member 36 to a position illustrated in FIG. 4, inner or second member 46 and rod 60 are simultaneously moved from the position illustrated in FIG. 3 to the position illustrated in FIG. 4. During this movement, expansible means or gripping jaws 48 as well as enlarged portion 64 of rod 60 pass through the aperture in insert 16 as well as opening 18 in container end panel 14.

Figure 5:
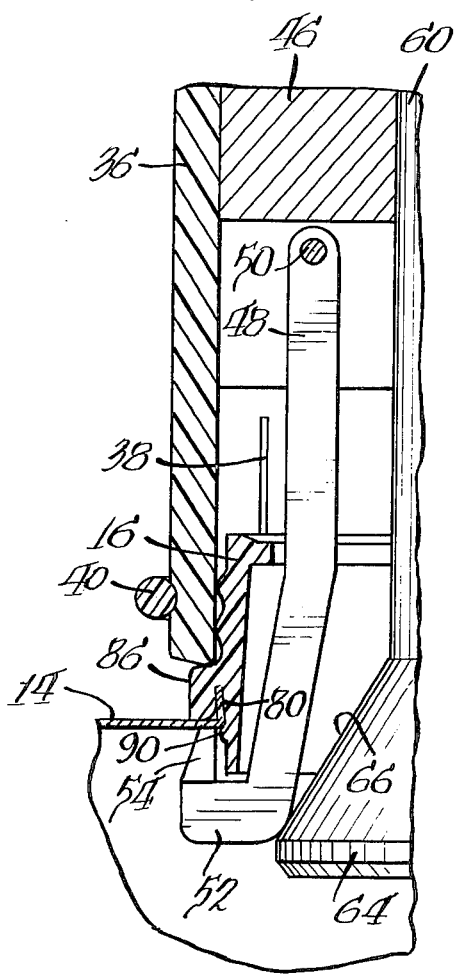

After the second member 42 is in the position illustrated in FIG. 4, rod 60 is moved upwardly to pivot jaws 48 about pivot pins 50 from the position illustrated in FIG. 4 to that illustrated in FIG. 5 wherein the vertically extending portions or legs 54 of expansible means extend beyond the periphery of opening 18. Simultaneously to vertical movement of rod 60 or preferably subsequent thereto, inner member or plunger 46 is also moved upwardly to a position wherein the upper edges of legs 54 engage the lower inner surface of end panel 14 directly outside the periphery of opening 18. While upwardly directed legs 54 are in engagement with the lower surface of end panel 14, outer member or gripping member 36 is moved downwardly from the position illustrated in FIG. 4 to that illustrated in FIG. 5 by proper configuration of camming surface 76, to force rim 80 into groove 88 as illustrated in FIG. 5. During such downward movement of insert 16, the lower end of the insert is compressed sufficiently to force lip 90 through the rim 80 and ultimately locate lip 90 below the lower surface of end panel 14 whereupon the lower end is moved outwardly due to the inherent resiliency of the material to securely lock and seal insert 16 onto end panel 14.

Figure 6:
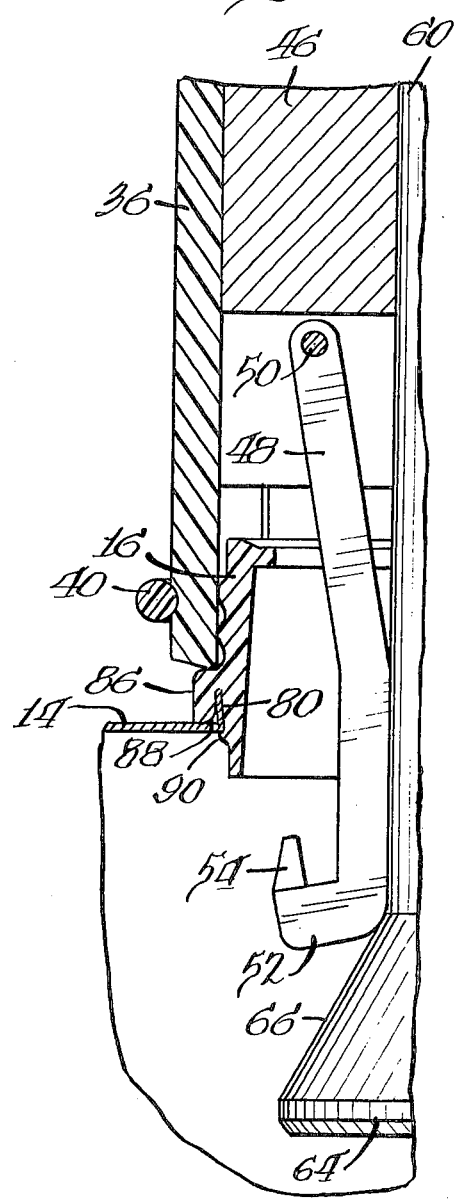

After the insert has been assembled onto end panel 14, member 46 and rod 60 are moved to the position illustrated in FIG. 6 and the entire assembly 34 may then be retracted to the position illustrated in FIG. 3 for reception of a subsequent insert. During such retraction, it is preferable that the container 10 be held by some suitable means (not shown) to insure that the container is not lifted with assembly 34 during the retraction thereof.

As can be appreciated from the above description, the present invention provides a unique simple arrangement for assembling threaded, apertured inserts onto an end panel of a container and any degree of force can be utilized to insure that there is a proper seal between the insert and the container end panel as well as sufficient holding power between the two to prevent rotation of the insert relative to the container when a closure is applied to the insert or removed therefrom. The method of the present invention can be accomplished by an extremely simple apparatus that can be constructed at a minimum amount of cost.

Of course, various modifications may come to mind without departing from the spirit of the invention. For example, if additional sealing and holding characteristics are desired, a sealing compound may be located in the upper end of annular groove 88 and/or an adhesive or sealing compound may be applied to rim 80 or to the peripheral surfaces of groove 88.

What is claimed is:

1. Apparatus for assembling a nonmetallic apertured insert onto a rim extending from the end panel of a metal container and surrounding an opening therein, comprising: support means for supporting said container, a first member for gripping said insert, a second member adapter to pass through the aperture in said insert, said second member having expansible means for extending beyond the periphery of said opening, and drive means for (1) moving said second member relative to said first member to pass said second member through the aperture of an insert gripped by said first member and the opening of the container, (2) expanding said expansible means beyond the periphery of said opening, and (3) moving said members towards each other to force said insert onto said rim while supporting said end panel by said expansible means.

2. Apparatus as defined in claim 1, in which said expansible means includes a plurality of jaws having one end pivoted on said second member and in which said drive means includes a camming member movable relative to said second member to force said jaws outwardly beyond the periphery of said opening.

3. Apparatus as defined in claim 1, in which said insert is circular and has a threaded portion on one end thereof and in which said first member is a hollow circular member having an inner surface adapted to grip said threaded portion with said insert having an outwardly directed flange intermediate opposite ends engaged by an end of said first member.

4. Apparatus as defined in claim 3, in which said second member is reciprocated in said first member, and said expansible means includes a plurality of jaws each having one end pivoted on a lower end of said second member and in which said drive means includes a rod reciprocated in said second member and having a lower end extending below lower free ends of said jaws, said lower end of said rod having an enlarging taper engaged by said jaws so that movement of said rod in said second member towards said jaws will pivot said jaws away from said rod.

5. Apparatus as defined in claim 4, in which said first and second members are supported for vertical reciprocal movement above said support means and in which said drive means includes cam means on said first member, said second member and said rod with camming surfaces movable relative to said members and cooperating with said cam means for reciprocating said members and rod relative to said support means.

6. Apparatus as defined in claim 5, in which said drive means includes a rotatable driven turntable with a plurality of circumferentially spaced stations on the periphery thereof each of said stations having vertically aligned support means and first and second members and in which said camming surfaces are fixed relative to said turntable.

7. A method of inserting nonmetallic apertured inserts onto a rim extending above the end of a metal container and surrounding an opening therein, comprising the steps of gripping an insert and aligning the insert with the opening in said container, passing a support member through the aperture in said insert and the opening in the container, moving said support member into engagement with said end adjacent the periphery of said opening, and moving said insert toward said container while said support member is in engagement with said end to force said insert onto said rim.

8. The method as defined in claim 7, in which the support member includes a plurality of jaws pivoted on a movable member and said jaws are cammed outward after being inserted through the aperture.

* * * * *